US012656302B2

(12) United States Patent
Kawamori et al.

(10) Patent No.: US 12,656,302 B2
(45) Date of Patent: Jun. 16, 2026

(54) HYDROGEN PERMEABILITY TESTING DEVICE

(71) Applicant: Kobe Steel, Ltd., Kobe (JP)

(72) Inventors: Makoto Kawamori, Kobe (JP); Junichiro Kinugasa, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 610 days.

(21) Appl. No.: 17/641,781

(22) PCT Filed: Sep. 1, 2020

(86) PCT No.: PCT/JP2020/033116
§ 371 (c)(1),
(2) Date: Mar. 9, 2022

(87) PCT Pub. No.: WO2021/049379
PCT Pub. Date: Mar. 18, 2021

(65) Prior Publication Data
US 2022/0373506 A1      Nov. 24, 2022

(30) Foreign Application Priority Data
Sep. 11, 2019      (JP) ................................. 2019-165535

(51) Int. Cl.
G01N 27/413      (2006.01)
G01N 27/416      (2006.01)

(52) U.S. Cl.
CPC ......... G01N 27/413 (2013.01); G01N 27/416 (2013.01)

(58) Field of Classification Search
CPC .. G01N 27/413; G01N 27/416; G01N 27/041; G01N 27/26; G01N 27/28;

(Continued)

(56) References Cited

U.S. PATENT DOCUMENTS

| 2006/0038159 A1* | 2/2006 | Fukutani | .................. | C09K 3/18 |
| | | | | 252/75 |
| 2011/0192321 A1* | 8/2011 | Bohlander | ............ | C01B 33/325 |
| | | | | 106/287.3 |

(Continued)

FOREIGN PATENT DOCUMENTS

| JP | 2000-282296 A | 10/2000 |
| JP | 2010-13548 A | 1/2010 |

(Continued)

OTHER PUBLICATIONS

Hayasaka et al., English translation of JP-2010013548-A, 2010 (Year: 2010).*

(Continued)

*Primary Examiner* — Shizhi Qian
(74) *Attorney, Agent, or Firm* — Oblon, McClelland, Maier & Neustadt, L.L.P.

(57)      ABSTRACT

A hydrogen permeability testing device can measure hydrogen amount(s) entering a metal material by electrochemical hydrogen permeation. The device may include: a metal specimen having a hydrogen entry face through which hydrogen enters, a hydrogen detection face on which the entered hydrogen is detected, and a metal plating formed on the hydrogen detection face to detect the entered hydrogen; a reference and counter electrode for making an electrochemical reaction progress; an electrolytic vessel provided on a hydrogen detection face side, housing the reference and counter electrode, and containing an aqueous sodium silicate solution having a freezing point of ≤0° C. and capable of suppressing residual current to ≤10 nA/cm² when an electric potential of the hydrogen detection face is −1 to 1 V relative to the reference electrode; and a measurement unit which measures the amount of hydrogen based on a current value resulting from the electrochemical reaction.

15 Claims, 2 Drawing Sheets

(58) Field of Classification Search

CPC .. G01N 17/006; G01N 17/00; G01N 33/2025; G01N 13/04

See application file for complete search history.

(56) References Cited

U.S. PATENT DOCUMENTS

| | | | | |
|---|---|---|---|---|
| 2015/0219549 A1* | 8/2015 | Ootsuka | ............... | G01N 27/304 |
| | | | | 204/404 |
| 2021/0293694 A1* | 9/2021 | Takeuchi | ............... | G01N 27/28 |

FOREIGN PATENT DOCUMENTS

| JP | 2010013548 A | * | 1/2010 |
|---|---|---|---|
| JP | 2013-181936 A | | 9/2013 |
| JP | 5754566 B2 | | 7/2015 |
| JP | 2015155520 A | * | 8/2015 |
| JP | 2017090370 A | * | 5/2017 |

OTHER PUBLICATIONS

Nakajima et al., English translation of JP-2015155520-A, 2015 (Year: 2015).*

Lee et al., Experimental study of freezing characteristics and antifreezing method of liquid additive for early strength, Journal of the Korea Concrete Institute, 2007, 19, 647-653 (Year: 2007).*

Kihara et al., English translation of JP2017090370A, 2017 (Year: 2017).*

International Search Report (English and Japanese versions) and Written Opinion (Japanese version) issued on Oct. 6, 2020 in PCT/JP2020/033116 filed on Sep. 1, 2020, 8 pages.

K. Takai, "Hydrogen Existing States and Hydrogen Embrittlement," Zairyo-to-Kankyo, 2011, vol. 60, No. 5, pp. 230-235, 6 pages, including English abstract.

M. A. V. Devanathan et al., "The Mechanism of Hydrogen Evolution on Iron in Acid Solutions by Determination of Permeation Rates," Journal of the Electrochemical Society, 1964, vol. 111, No. 5, pp. 619-623, 5 pages.

T. Omura et al., "Environmental Factors Affecting Hydrogen Absorption into Steels," Zairyo-to-Kankyo, 2005, vol. 54, No. 2, pp. 61-67, 7 pages. including English abstract.

H. Hagi et al., "Diffusion Coefficient of Hydrogen in Pure Iron between 230 and 300 K," Transactions of the Japan Institute of Metals, 1979, vol. 20, pp. 349-357, 9 pages.

Extended European Search Report issued on Sep. 9, 2022 in European Patent Application No. 20863388.3, 7 pages.

* cited by examiner

HYDROGEN PERMEABILITY TESTING DEVICE

CROSS-REFERENCE TO RELATED APPLICATIONS

The present application is the national stage of international application PCT/JP2020/033116, filed on Sep. 1, 2020, and claims the benefit of the filing date of Japanese Appl. No. 2019-165535, filed on Sep. 11, 2019.

TECHNICAL FIELD

The present disclosure relates to a hydrogen permeability testing device capable of evaluating the amount of hydrogen in a metal material even at low temperatures.

BACKGROUND ART

Low fuel consumption of automobiles has been demanded in recent years, from the viewpoint of global environmental issues, for which weight reduction of vehicle bodies has been underway as one of solutions. As an exemplary method for reducing the weight, an effort has been made to strengthen bolts for automobile suspension system, thereby downsizing the bolts. Use of high-strength steel, however, poses a problem that a steel material during use would corrode to produce hydrogen, and the hydrogen if enters the steel would cause delayed fracture. Unlike a high-strength steel plate used for a body frame, the bolts for the automobile suspension system may be exposed not only to the atmosphere, wind and rain when the automobile runs, but also to a strongly corrosive environment with an antifreezing agent such as NaCl or $CaCl_2$ spread in the wintertime for road deicing.

For prevention of the delayed fracture, a key point is to estimate the amount of hydrogen in a metal material, which is one of the dominant factors. In particular, in the wintertime when the antifreezing agent is spread, some places would experience very low temperatures such as −15° C. or below. There is therefore a need for a testing device that can evaluate the amount of hydrogen with high sensitivity, even set at such very low temperatures.

Various methods have been proposed aiming at measuring the amount of hydrogen in a metal material. For example, thermal desorption spectroscopy such as described in Non Patent Document 1 has been proposed as a common technique. According to the thermal desorption spectroscopy described in Non Patent Document 1, a metal material is heated, and desorbed hydrogen is detected with use of a mass spectrometer or gas chromatography, whereby the amount and mode of existence of hydrogen in the metal material are evaluated. The amount of entered hydrogen, however, largely varies depending on changes of temperature, humidity, amount of adhered salt or the like, and it has been difficult to evaluate temporal changes in the amount of entered hydrogen by the method described in Non Patent Document 1.

An electrochemical hydrogen permeation method such as described in Non Patent Document 2 has been proposed as a common technique for evaluating the temporal changes in the amount of entered hydrogen. In the electrochemical hydrogen permeation method, hydrogen is allowed to enter a metal material, with the aid of electrochemical cathode polarization or a corrosion-related cathode reaction, through one face (that is, hydrogen entry face) of the metal material. According to the electrochemical hydrogen permeation method, the entered hydrogen is rapidly oxidized by anodically polarizing the metal face on the opposite side (that is, hydrogen detection face) at an electric potential at which an oxidation reaction represented by $H \rightarrow H^{+}+e$ can proceed rapidly enough, and the oxidation current is detected to estimate the amount of hydrogen.

The electrochemical hydrogen permeation method, originally reported by Devanathan et al., has been modified or improved in various ways suitably for applications. For example, Non Patent Document 3 describes a test method capable of evaluating hydrogen entry in an atmospheric corrosive environment by exposing of the hydrogen entry face to the atmosphere. The method described in Non-Patent Document 3, uses an aqueous solution that contains NaOH, as a solution for oxidizing hydrogen (that is, a hydrogen detection solution) on the hydrogen detection face. However, when the antifreezing agent needs to be spread in a wintertime, the NaOH-containing aqueous solution freezes at low temperatures in such a wintertime. Freezing of the aqueous solution causes volume expansion of the aqueous solution, and has occasionally damaged the testing device.

As a method for measuring the amount of entered hydrogen at low temperatures, Non Patent Document 4 discloses an electrochemical hydrogen permeation method with use of an organic compound added to a hydrogen detection solution to depress the freezing point. The method described in Non Patent Document 4 uses a 0.2 M KOH solution in alcohol, containing a small amount of water, as a hydrogen detection solution, thus enabling the hydrogen permeability test applicable to a wide temperature range of 230 K to 300 K (−43° C. to 27° C.).

Similarly, Patent Document 1 proposes an electrochemical hydrogen permeation method that uses an organic compound added to a hydrogen detection solution so as to prevent freezing of the hydrogen detection solution. Patent Document 1 discusses a method for depressing the freezing point of the electrolytic solution to −5° C. or lower, and discloses a hydrogen permeation test with use of hydrogen detection solutions prepared by adding various ratios of dimethyl sulfoxide (DMSO) to a 0.1 N aqueous NaOH solution.

CONVENTIONAL ART DOCUMENT

Patent Document

Patent Document 1: JP 5754566 B2

Non Patent Document

Non Patent Document 1: Kenichi Takai, Zairyo-to-Kankyo, 60, 230 [

Non Patent Document 2: M. A. V. Devanathan and Z. Stachurski, J. Electrochem. Soc., 111, 619 (1964)

Non Patent Document 3: Tomohiko Omura et al., Zairyo-to-Kankyo, 54, 51 (2005)

Non Patent Document 4: H. Hagi et al., Transactions of the Japan Institute of Metals, 20, 349 (1979)

DISCLOSURE OF THE INVENTION

Problems to be Solved by the Invention

The method described in Non Patent Document 4, however, uses alcohol in the hydrogen detection solution. The alcohol in this case is oxidized when anodic polarization is induced on the hydrogen detection face at an electric potential for oxidizing hydrogen, and this oxidation reaction occasionally increases a noise current called a residual current. If the residual current is large, fluctuation in the residual current (i.e. noise) would mask hydrogen permeation current that occurs in response to entry of a trace amount of hydrogen. That is, it has been difficult to detect a trace amount of hydrogen caused by corrosion with high sensitivity.

The method described in Patent Document 1 enables detection of a trace amount of hydrogen caused by corrosion, etc. by using DMSO as an organic compound to reduce the residual current. The method described in Patent Document 1 has, however, been aimed at depressing the freezing point of the electrolytic solution (that is, a hydrogen detection solution) to −5° C. or below, and has not necessarily been sufficient for use at very low temperatures such as −15° C. or below. That is, Example described in Patent Document 1 are guessed to be difficult to carry out the hydrogen permeation test at very low temperatures such as −15° C. or below, since the freezing point of the electrolytic solution (that is, the hydrogen detection solution) is −12° C. at the lowest.

As another method for enabling the hydrogen permeation test at very low temperatures, a method adding a large amount of sodium hydroxide having been used conventionally as an inorganic substance is considered. This is because addition of a large amount of sodium hydroxide can largely depress the freezing point. Such addition of a large amount of sodium hydroxide, however, excessively increases pH of the solution. This unfortunately corrodes a metal plating such as Ni, Pd used for the hydrogen detection face, increases the residual current, making it difficult to detect a trace amount of hydrogen.

Embodiments of the present invention have been made under such circumstances, and an object of which is to provide a hydrogen permeability testing device capable of estimating the amount of hydrogen in a metal material, over a wide temperature range from very low temperatures at the freezing point or below, up to room temperature.

Means for Solving the Problems

An aspect 1 of the present invention is directed to a hydrogen permeability testing device for measuring the amount of hydrogen entering a metal material by using an electrochemical hydrogen permeation method, wherein the hydrogen permeability testing device comprises:

a metal specimen having a hydrogen entry face through which hydrogen enters, a hydrogen detection face on which the entered hydrogen is detected, and a metal plating which is formed on the hydrogen detection face to efficiently detect the entered hydrogen;

a reference electrode and a counter electrode for making an electrochemical reaction progress;

an electrolytic vessel that is provided on a side of the hydrogen detection face, houses the reference electrode and the counter electrode, and contains an aqueous sodium silicate solution having a freezing point of 0° C. or lower and capable of suppressing a residual current to 10 nA/cm$^2$ or below when an electric potential of the hydrogen detection face is set at −1 V to 1 V relative to the reference electrode; and a measurement unit which measures the amount of hydrogen based on a current value resulted from the electrochemical reaction.

An aspect 2 of embodiments of the present invention is directed to the hydrogen permeability testing device according to the aspect 1, wherein a relationship between Baumé degree Bh of the aqueous sodium silicate solution and an operating temperature T (° C.) satisfies T≥−0.5×exp (0.09× Bh).

An aspect 3 of embodiments of the present invention is directed to the hydrogen permeability testing device according to the aspect 1 or 2, wherein a molar ratio of SiO$_2$/Na$_2$O in the aqueous sodium silicate solution is 3.5 or smaller.

An aspect 4 of embodiments of the present invention relates to the hydrogen permeability testing device according to any one of the aspects 1 to 3, wherein a concentration of a sodium silicate solution in the aqueous sodium silicate solution is 10% by mass or higher.

An aspect 5 of embodiments of the present invention is directed to the hydrogen permeability testing device according to any one of the aspects 1 to 4, wherein the metal plating is formed of any one of Ni, Pd and Au.

An aspect 6 of embodiments of the present invention relates to a method for measuring the amount of hydrogen, wherein the method comprising:

preparing the hydrogen permeability testing device according to any one of the aspects 1 to 5;

leaving the hydrogen permeability testing device to stand for 5 hours or longer after the preparing; and measuring, after the leaving for 5 hours or longer, the amount of hydrogen based on a current value resulted from the electrochemical reaction.

Technical Effects of the Invention

According to the embodiments of the present invention, the amount of hydrogen in a metal material can be measured over a wide temperature range from very low temperatures at the freezing point or below, up to room temperature.

DESCRIPTION OF EMBODIMENTS OF THE INVENTION

Aiming at solving the aforementioned problem, the inventors of the present application have intensively studied in pursuit of that a hydrogen detection solution does not freeze even at lower temperatures at the freezing point or below (for example, −15° C. or below). As a common method for depressing the freezing point of a solvent, a method utilizing of a phenomenon of freezing point depression due to addition of an inorganic substance or an organic substance is exemplified. However, as mentioned above, there has been a problem that the added inorganic substance or the organic substance has increased residual current, or promoted corrosion of the metal material used for the hydrogen detection face.

The inventors have intensively studied a hydrogen permeability testing device capable of (1) causing a small residual current when anodically polarizing at an electric potential for oxidizing hydrogen on the hydrogen detection face, (2) causing no corrosion of the metal material concerned, and (3) causing no damage on the hydrogen permeability testing device even at very low temperatures at the freezing point or below (for example, −15° C. or below). The inventors consequently found that the residual current can be reduced without corroding the metal material concerned, by using a concentrated aqueous sodium silicate solution (that is, soda silicate) as the hydrogen detection solution in a predetermined structure. The inventors also found that the amount of hydrogen can be measured without damaging the hydrogen permeability testing device, even at very low temperatures which are the freezing point or below. The concentrated aqueous sodium silicate solution is, however, highly viscous and difficult to handle, as compared with aqueous sodium hydroxide solution having been used conventionally as the hydrogen detection solution. Therefore, the concentrated aqueous sodium silicate solution has not been used conventionally for the hydrogen permeability testing device.

Figure 1:
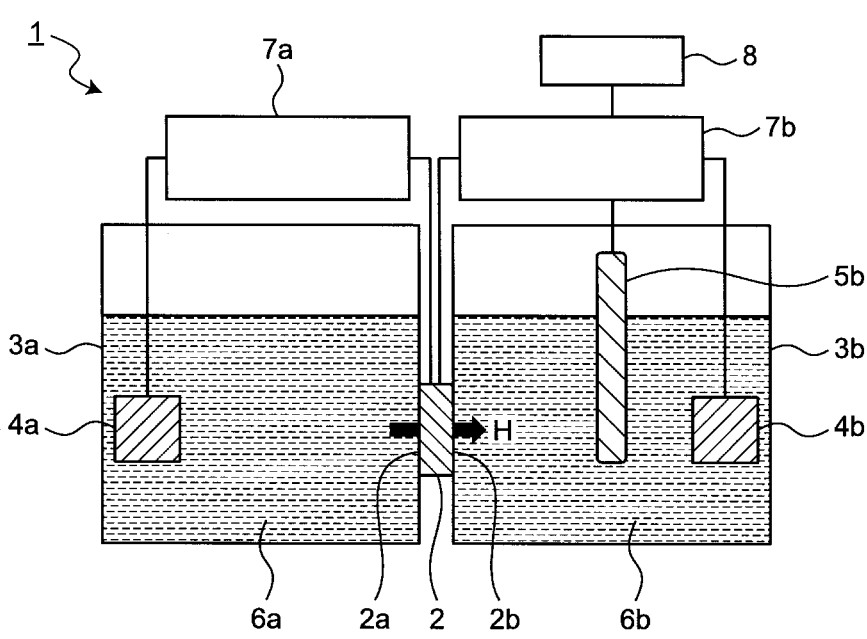
FIG. 1 is a schematic drawing illustrating a hydrogen permeability testing device according to the embodiments of the present invention.

A hydrogen permeability testing device according to the embodiments of the present invention will be detailed referring to FIG. 1. FIG. 1 is a schematic drawing illustrating a hydrogen permeability testing device 1 according to the embodiments of the present invention. A hydrogen permeability testing device 1 according to the embodiments of the present invention has a metal specimen 2, electrolytic vessels 3*a*, 3*b*, potentiostats/galvanostats 7*a*, 7*b*, and a recorder 8. Note that the potentiostat/galvanostat 7*b* and the recorder 8 constitute the "measurement unit" specified in CLAIMS.

The two electrolytic vessels 3*a*, 3*b* are arranged opposed to each other, while placing the metal specimen 2 in between. In each of the electrolytic vessels 3*a*, 3*b*, a hole (not illustrated) through which the metal specimen 2 is contacted with a later-described solution 6*a* or a hydrogen detection solution 6*b* is provided at a part where the metal specimen 2 is attached. The electrolytic vessel 3*a* contains the solution 6*a* for making hydrogen enter the metal specimen 2. The solution 6*a* may be a solution having been used in a conventional hydrogen permeability testing device, and is a 0.1 M NaOH solution as an example. In the solution 6*a*, a counter electrode 4*a* is immersed. The potentiostat/galvanostat 7*a* is connected to the metal specimen 2 and the counter electrode 4*a*. The electrolytic vessel 3*b* contains the hydrogen detection solution 6*b*. The hydrogen detection solution 6*b* will be detailed later. In the hydrogen detection solution 6*b*, a counter electrode 4*b* and a reference electrode 5*b* are immersed. The potentiostat/galvanostat 7*b* is connected to the metal specimen 2, the counter electrode 4*b*, and the reference electrode 5*b*. The recorder 8 is connected to the potentiostat/galvanostat 7*b*.

Figure 4:
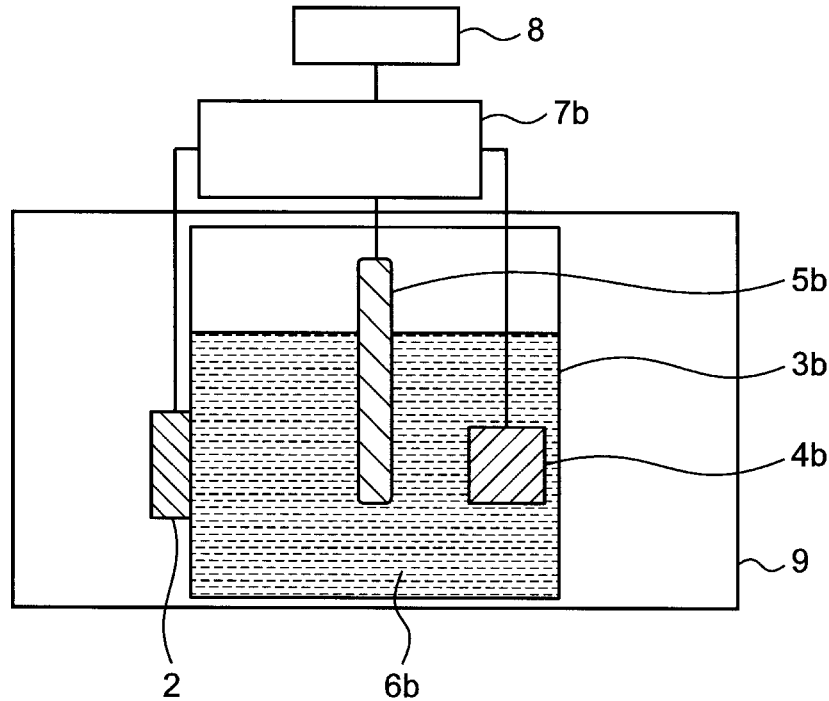
FIG. 4 is a schematic drawing illustrating a hydrogen permeability testing device used for evaluating durability in Example.

The hydrogen permeability testing device 1 according to the embodiments of the present invention measures the amount of hydrogen that enters the metal specimen 2, with use of an electrochemical hydrogen permeation method. The electrochemical hydrogen permeation method per se has been known conventionally as a method for measuring a hydrogen permeability coefficient in steel plate. In FIG. 1, a surface of the metal specimen 2 in the electrolytic vessel 3*a* on the left side (may be occasionally referred to as "cathode side", hereinafter) is cathodically polarized at a constant electric potential or a constant current to generate and charge hydrogen. On the other hand, in the electrolytic vessel 3*b* on the right side (may be occasionally referred to as "anode side", hereinafter), the metal specimen 2 is anodically polarized at a constant electric potential. This oxidizes hydrogen having permeated through the metal specimen 2 into hydrogen ion to produce oxidation-induced current, and the amount of permeated hydrogen can be determined from the current value. A structure on the cathode side is not limited specially, and any one of conventional structures is applicable for it. Note that, in the embodiments of the present invention, the structure on the cathode side is omissible. That is, in the embodiments of the present invention, a structure as illustrated in FIG. 4 described later may be applied. Generation and charging of hydrogen in this case are enabled, for example, by making the cathode side of the metal specimen 2 corrode in the atmosphere, etc. The metal specimen 2 and structures of the anode side will be explained below.

1. Metal Specimen

The metal specimen 2 is a target to be measured for the amount of hydrogen. The metal specimen 2 may have any shape of plate, rod, bolt or the like. The metal specimen 2 illustrated in FIG. 1 has a plate shape. For the plate shape, the thickness is preferably 0.1 mm to 10 mm. The metal specimen 2 illustrated in FIG. 1 has a hydrogen entry face 2*a* through which hydrogen enters, and a hydrogen detection face 2*b* on which the entered hydrogen is detected. The metal specimen 2 may have strain introduced to the surface thereof by mechanical working such as cutting or polishing during manufacture. Results of measurement of the amount of hydrogen, especially the diffusion coefficient of hydrogen, may vary with the introduced strain. Therefore, it is preferable to electrolytically polish so that a position at a depth of 10 μm or deeper below the metal surface of the hydrogen detection face 2*b* will expose.

On the hydrogen detection face 2*b*, a metal plating is formed. With the metal plating thus formed, a trace amount of hydrogen can be easily detected. Specifically, this reduces a passivation-maintaining current of the hydrogen detection face 2*b*, and makes the oxidation reaction represented by H→H⁺+e smoothly progress. The passivation-maintaining current is a sort of the residual current. Reduction of the passivation-maintaining current can reduce the residual current, and enables easy detection of a trace amount of hydrogen. Type of the metal plating is preferably selected from materials having a small passivation-maintaining current, a dense and poreless structure, such as Ni plating, Pd plating, or Au plating. Method for plating is preferably electroplating, electroless plating, or vacuum evaporation by sputtering since these methods are easy to control plating thickness, and can suppress unnecessary entry of hydrogen.

Too small plating thickness may cause exposure of the base, resulting in increase of the passivation-maintaining current, and delay of the oxidation reaction represented by H→H⁺+e. The plating thickness is therefore preferably 1 nm or thicker, and more preferably 10 nm or thicker. Meanwhile if the plating thickness is too large, hydrogen diffusion in the plating acts as a rate-limiting process, so that the hydrogen diffusion coefficient may be underestimated. The plating thickness is therefore preferably 1000 nm or thinner, and more preferably 500 nm or thinner.

2. Hydrogen Detection Solution 2-1. Aqueous Sodium Silicate Solution

The hydrogen detection solution 6*b* contained in the electrolytic vessel 3*b* is an electrolyte solution that ionizes hydrogen having been permeated through the metal specimen 2. The hydrogen detection solution 6*b* in the embodiments of the present invention is aqueous sodium silicate solution. Use of the aqueous sodium silicate solution can suppress the passivation-maintaining current of the hydrogen detection face 2b at room temperature, without corroding the anode side of the metal material 2, and can consequently suppress the residual current down to 10 $nA/cm^2$ or below. The residual current, if 10 $nA/cm^2$ or below, is considered to be suppressed enough, and enables highly sensitive measurement of hydrogen permeation current. The residual current is preferably reduced to 8 $nA/cm^2$ or below, and more preferably 5 $nA/cm^2$ or below. The residual current is most preferably 0 $nA/cm^2$.

The aqueous sodium silicate solution may be prepared by adding sodium silicate solution to water. Note that aqueous sodium hydroxide solution may be used in place of water. When using the aqueous sodium hydroxide solution, the concentration of sodium hydroxide preferably ranges from 0% by mass to 10% by mass, in order to suppress the residual current from increasing. The sodium silicate solution is usually represented by a molecular formula $Na_2O \cdot nSiO_2 \cdot mH_2O$. Coefficient n represents a molar ratio of $SiO_2$ to $Na_2O$. It is called sodium orthosilicate if the molar ratio n is 0.5, and is called sodium metasilicate if the molar ratio n is 1. Both of them are crystalline and usually in the form of powder. It has an amorphous form if the molar ratio n is larger than 1, enables continuous variation in the molar ratio n, and usually exists in the form of aqueous solution called water glass, or soda silicate, etc. Note that the term "sodium silicate solution" in this specification means commercially available undiluted solution of sodium silicate solution. Meanwhile, the term "aqueous sodium silicate solution" means a solution obtained by diluting the sodium silicate solution with water.

JIS standard (JIS K1408: 1966) specifies sodium silicate Type 1 ($SiO_2$: 35 to 38%, $Na_2O$: 17 to 19%), sodium silicate Type 2 ($SiO_2$: 34 to 36%, $Na_2O$: 14 to 15%), sodium silicate Type 3 ($SiO_2$: 28 to 30%, $Na_2O$: 9 to 10%), sodium metasilicate Type 1 ($SiO_2$: 27.5 to 29%, $Na_2O$: 28.5 to 30%), and sodium metasilicate Type 2 ($SiO_2$: 19 to 22%, $Na_2O$: 20 to 22%). That is, the sodium silicate solution contains 19 to 38% by mass of $SiO_2$, 9 to 30% by mass of $Na_2O$, and the balance is almost water. In the embodiments of the present invention, the molar ratio n is preferably 3.5 or smaller, since too large molar ratio n may result in insufficient depression of freezing point. The molar ratio is more preferably 2.5 or smaller, and even more preferably 2.2 or smaller. The lower limit of the molar ratio n, although not specifically limited, is preferably 1.0 or larger from the viewpoint of reducing the viscosity, and is more preferably 1.5 or larger.

2-2. pH of Aqueous Sodium Silicate Solution

In order to suppress the passivation-maintaining current of the metal plating on the hydrogen detection face 2b, pH of the aqueous sodium silicate solution is preferably kept in the alkaline range. Too low pH may fail in passivating the hydrogen detection face 2b. The pH is therefore preferably 8 or higher, and more preferably 10 or higher. On the other hand, too high pH results in excessive increase of the passivation-maintaining current, so that the pH is preferably 14 or lower, and more preferably 13.5 or lower. The pH may be measured by a usual method, for example, by using of pH meter or pH test paper. The pH of the aqueous sodium silicate solution may vary depending on the concentration of the aqueous sodium silicate solution described later, etc. Therefore, it is preferable that the aqueous sodium silicate solution, prepared with determining the concentration, the aforementioned molar ratio n, and so forth, has the pH within the aforementioned preferred range as a result.

2-3. Baumé Degree Bh of Aqueous Sodium Silicate Solution

Hydrogen detection at low temperatures may damage the hydrogen permeability testing device 1 due to freeze of the hydrogen detection solution 6b and the volume expansion. Hence, in the embodiments of the present invention, the Baumé degree Bh of the aqueous sodium silicate solution in the hydrogen detection solution 6b is preferably increased to sufficiently depress the freezing point. The Baumé degree Bh is a measurement unit of specific gravity. The inventors found by studying intensively that it is preferable to adjust a relationship between the Baumé degree Bh of the aqueous sodium silicate solution and operating temperature T (° C.) so as to satisfy "$T \geq -0.5 \times exp(0.09 \times Bh)$". A value on the right side of the above relational expression is set to a temperature higher than the freezing point of the aqueous sodium silicate solution, that is, an appropriate temperature at which the aqueous sodium silicate solution would not freeze. Specifically, the sodium silicate solution is preferably added to water or the like, so as to adjust the Baumé degree Bh to 26 or larger if the lower limit of the operating temperature T is –5° C. or above; to 33 or larger for a lower limit of –10° C. or above; and to 41 or larger for a lower limit of –20° C. or above. Note that the freezing point of the aqueous sodium silicate solution itself is 0° C. or lower, preferably –5° C. or lower, more preferably –10° C. or lower, and even more preferably –15° C. or lower.

2-4. Concentration of Aqueous Sodium Silicate Solution

For hydrogen detection at low temperatures, too low concentration of the sodium silicate solution in the aqueous sodium silicate solution may fail in sufficiently depressing the freezing point, and may damage the hydrogen permeability testing device 1. The concentration of the aqueous sodium silicate solution is therefore preferably 10% by mass or higher. The content is more preferably 20% by mass or higher, and even more preferably 40% by mass or higher. On the other hand, too high concentration of the aqueous sodium silicate solution excessively increases the viscosity to make the handling difficult. The concentration of the aqueous sodium silicate solution is therefore preferably 98% by mass or lower. The concentration is more preferably 95% by mass or lower. Note that although variation in the molar ratio $SiO_2/Na_2O$ in the sodium silicate solution to be used may vary the preferred concentration range, a desired effect can be obtained regardless of such variation in the molar ratio of the sodium silicate solution, within the aforementioned preferred concentration ranges.

2-5. Preparation of Aqueous Sodium Silicate Solution

Since the sodium silicate solution is highly viscous, when mixing the sodium silicate solution with water or the like for use air bubbles may be inevitably mixed therein during the mixing. The air bubbles, if adsorbed on the metal specimen 2, suppress the electrochemical reaction on the hydrogen detection face 2b. The aqueous sodium silicate solution therefore needs to remove the air bubbles mixed therein. The method for removing the air bubbles is preferably as follows. That is, first, the sodium silicate solution is mixed with water or the like, and the mixed solution is contained in the electrolytic vessel 3b. The counter electrode 4b, the reference electrode 5b, and so forth are arranged, that is, the preparation before measuring the amount of hydrogen is completed, and then the arrangement is left in this state for 5 hours or longer. The leaving time is preferably 8 hours or longer, and more preferably 12 hours or longer. This successfully expels the air bubbles entrained in the sodium silicate aqueous solution. The leaving time is preferably 100 hours or shorter from the viewpoint of work efficiency, and is more preferably 80 hours or shorter. By using the aqueous sodium silicate solution, from which the air bubbles are removed, for the measurement, the amount of hydrogen can be appropriately measured based on a current value resulted from the electrochemical reaction described later.

3. Reference Electrode and Counter Electrode

The reference electrode 5b and the counter electrode 4b are electrodes for anodically polarizing the hydrogen detection face 2b at an electric potential for oxidizing hydrogen. For the reference electrode 5b, generally commercially available silver-silver chloride electrode, a saturated calomel electrode, or the like is preferably used, so as to stabilize the electric potential in the hydrogen detection solution 6b. Hydrogen detection at low temperatures may, however, freeze the internal solution of the silver-silver chloride electrode or the saturated calomel electrode. Hence, for the hydrogen detection at low temperatures, a noble metal such as Pt, Ag, or Ir is preferably used as a pseudo-reference electrode. The reference electrode 5b may have any shape of rod, plate, or spiral. For the counter electrode 4b, it is preferable to use a noble metal such as Pt, Ag, or Ir which is non-susceptible itself to redox reaction. The counter electrode 4b may have any shape of rod, plate, or spiral.

4. Potentiostat/Galvanostat and Recorder

The potentiostat/galvanostat 7b measures a current value obtainable from the hydrogen detection face 2b. The potentiostat/galvanostat 7b may be any of conventional devices capable of measuring fine current. The potentiostat/galvanostat 7b is also preferably allowed for electric potential control, so that the hydrogen detection face 2b may be anodically polarized at an electric potential at which the oxidation reaction represented by $H \rightarrow H^+ + e$ can progress rapidly enough. The electric potential of the hydrogen detection face 2b is set within the range from $-1$ V to 1 V with respect to the reference electrode 5b, so as to lower the passivation-maintaining current at the hydrogen detection face 2b. The electric potential of the hydrogen detection face 2b is preferably set to $-500$ mV or above, and more preferably 0 V or above, with respect to the reference electrode 5b. The electric potential of the hydrogen detection face 2b is preferably set to 800 mV or below, and more preferably 500 mV or below, with respect to the reference electrode 5b. With the electric potential of the hydrogen detection face 2b set within the range from $-1$ V to 1 V, and with use of the aforementioned appropriate metal specimen 2 and the aqueous sodium silicate solution, the passivation-maintaining current can be reduced, and the residual current can be suppressed to 10 nA/cm$^2$ or below as a result. The recorder 8 measures and records the current value that corresponds to the amount of permeated hydrogen on the hydrogen detection face 2b. Any of conventional devices is applicable to the recorder 8.

EXAMPLE

Next, Example of the hydrogen permeability testing device according to the embodiments of the present invention will be specifically described, in comparison with Comparative Example. The following Example is, however, not intended to limit the present invention, and can be carried out with appropriate modifications within a range that can conform to the gist described previously or later. Also any of such modifications is included in the scope of the present invention.

1. Manufacture of Specimen

A specimen of 32 mm in diameter and 0.5 mm thick was manufactured from a commercially available SCM435 steel material. The surface of the specimen was wet-polished with an emery paper No. 1500, washed with water, degreased with acetone, and dried. Both surfaces of the specimen were then electrolytically polished using a chromic acid-saturated phosphoric acid solution, and one face of the specimen on the side of the hydrogen detection face was plated with Ni in a Watts bath. The electropolishing was carried out so that a position at a depth of 10 μm to 50 μm from the surface of the specimen exposes. The thickness of the Ni plating was adjusted to 100 nm to 1000 nm.

2. Hydrogen Permeability Test 2-1. Preparation of Hydrogen Permeability Testing Device The thus manufactured metal specimen was sandwiched between two acrylic vessels (that is, electrolytic vessels) each having a hole of 8 mm in diameter. Into the container on the side of the hydrogen detection face, an aqueous sodium silicate solution prepared by adding 10 wt % of water to sodium silicate solution Type 1 (from Kishida Chemical Co., Ltd.) was added as the hydrogen detection solution (that is, 90% by mass aqueous sodium silicate solution was added). For Comparative Example, an experiment was concurrently conducted with use of a 0.2 M aqueous sodium hydroxide solution, whose concentration would not increase the passivation-maintaining current, as the hydrogen detection solution. The Baumé degrees of the 90% by mass aqueous sodium silicate solution and the 0.2 M aqueous sodium hydroxide solution at room temperature (about 20° C.) were 52.6 and 0, respectively. The Baumé degree was estimated by measuring the weight and volume of the thus formulated solutions, with a weight scale and a measuring cylinder, respectively. The molar ratio SiO$_2$/Na$_2$O of the aqueous sodium silicate solution Type 1 used here was approximately 2. pH of the 90% by mass aqueous sodium silicate solution was 13 when measured with a pH meter.

2-2. Removal of Air Bubbles in Aqueous Sodium Silicate Solution and Measurement of Residual Current In order to promote passivation of Ni applied to the hydrogen detection face, the hydrogen detection face was anodically polarized while using platinum as the counter electrode, and iridium as the reference electrode, at an electric potential of 0.15 V relative to iridium. The aqueous sodium silicate solution was then leaved to stand for 12 hours or longer, so as to remove the air bubbles mixed therein. The residual current was then checked as being 10 nA/cm$^2$ or lower.

2-3. Addition of Solution to Vessel on Side of Hydrogen Entry Face

A thermocouple was immersed in the hydrogen detection solution for temperature measurement. For an experiment maintaining at low temperatures equal to or lower than room temperature, the hydrogen permeability testing device was kept in a cooling container. When a test is conducted at room temperature, the test was conducted indoor, without using the cooling container, while setting the room temperature to around 18° C. to 21° C. After checking that the test temperature was constant, a solution prepared by adding 40 vol % of ethylene glycol as an antifreezing agent to a 0.2 N aqueous NaOH solution was added in the vessel on the side of the hydrogen entry face.

2-4. Measurement of Hydrogen Permeation Current

On the cathode side, the hydrogen entry face of the specimen was cathodically polarized at a current density of 1 μA/mm$^2$ with use of platinum as the counter electrode, thereby making hydrogen enter the metal specimen. Current value obtained from the hydrogen detection face was measured as the hydrogen permeation current, with use of a potentiostat/galvanostat. The electric potential of the metal specimen was set to 0.15 V relative to iridium. The hydrogen permeability coefficient was then determined from the equation below, with use of the area and the thickness of the specimen.

$$\text{Hydrogen permeability coefficient} = (\text{Current value of the specimen})/(\text{area of the specimen}) \times (\text{Thickness of the specimen})$$

2-5. Measurement Results

Figure 2:
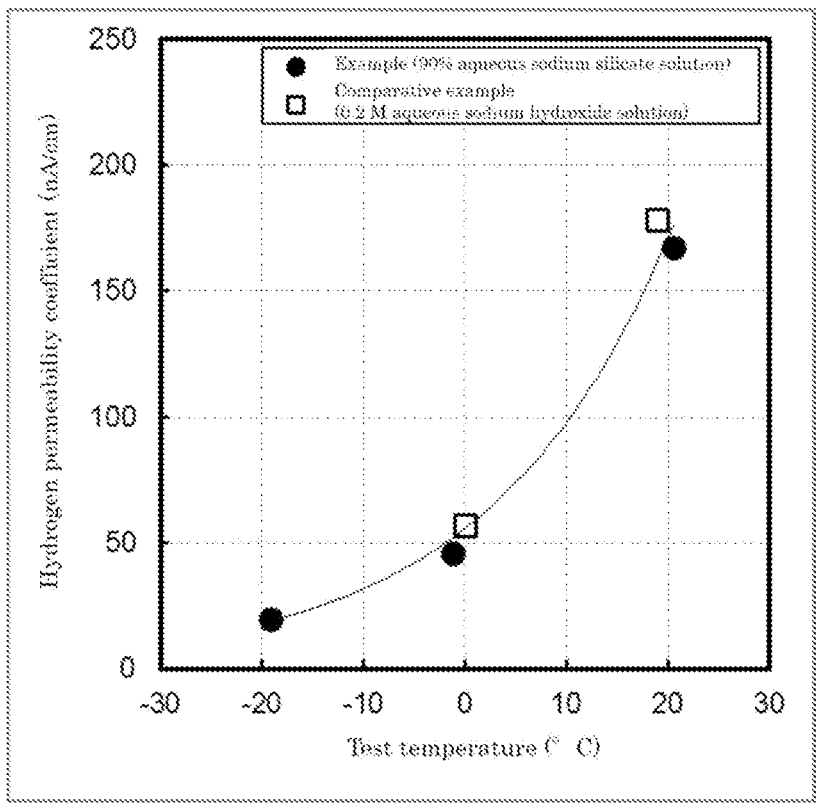
FIG. 2 is a graph illustrating relation between test temperatures and hydrogen permeability coefficients in Example.

The test was terminated 90 minutes after the start of the cathode polarization, and maximum values of the hydrogen permeability coefficient obtained at the individual test temperatures are summarized in Table 1 and FIG. 2. FIG. 2 is a graph illustrating relation between the test temperature and the hydrogen permeability coefficient. Note that in Comparative Example in which the 0.2 M aqueous sodium hydroxide solution was used, the hydrogen detection solution was freezed approximately at –1° C. or below. The hydrogen permeation test at –1° C. or below was therefore not conducted when the 0.2 M aqueous sodium hydroxide solution was used in the test. As can be understood from Table 1 and FIG. 2, Example with use of the 90% by mass aqueous sodium silicate solution showed a maximum hydrogen permeability coefficient, which is equivalent to that obtainable in a case with use of a conventional aqueous sodium hydroxide solution. Example was also successful in detecting the amount of hydrogen even at –19.2° C. Therefore, it was found that the hydrogen permeability testing device according to the embodiments of the present invention can measure the amount of hydrogen in the metal material, over a wide temperature range from very low temperatures such as –15° C. or below up to room temperature.

2-6. Check of Freezing Point

Figure 3:
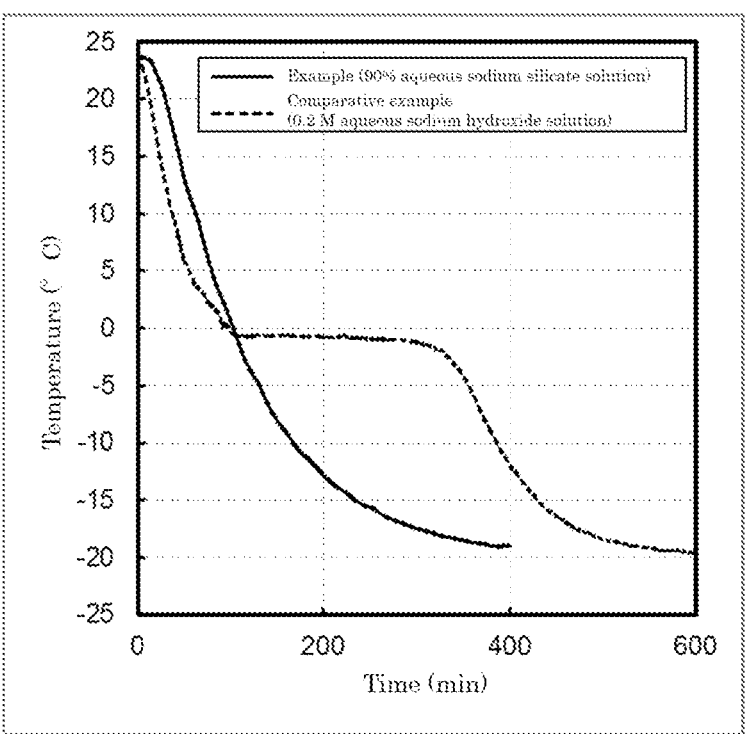
FIG. 3 is a graph illustrating temporal changes in temperature by a thermocouple placed in hydrogen detection solutions in Example.

The freezing point of the 90% by mass aqueous sodium silicate solution was checked. FIG. 3 illustrates temporal changes in temperature of the thermocouple immersed in the hydrogen detection solution, measured when the hydrogen permeability testing device at room temperature was stored in a cooling container kept at around –20° C. Comparative Example with use of the 0.2 M aqueous sodium hydroxide solution was found to cause freezing, since the temperature reached a plateau at around –1° C. In contrast, Example with use of the 90% by mass aqueous sodium silicate solution was found to give a freezing point of –15° C. or below, since the temperature was decreased without causing freezing.

TABLE 1

| Hydrogen detection solution | Test temperature (° C.) | Hydrogen permeability coefficient (nA/cm) | Category |
|---|---|---|---|
| 90% aqueous sodium silicate solution | 20.5 | 167 | Example |
| | –1.2 | 46 | |
| | –19.2 | 20 | |
| 0.2M aqueous sodium hydroxide solution | 18.9 | 179 | Comparative Example |
| | 0 | 57 | |

3. Evaluation of Durability of Hydrogen Permeability Testing Device

Durability of the hydrogen permeability testing device was evaluated. FIG. 4 is a schematic drawing illustrating a hydrogen permeability testing device used for evaluating the durability. As illustrated in FIG. 4, the metal specimen 2 manufactured as described above was attached to the acrylic vessel 3b having a hole of 16 mm in diameter. In this durability evaluation, the reference electrode 5b and the counter electrode 4b were arranged in the acrylic vessel 3b, so as to simulate the aforementioned hydrogen permeation test. Also the potentiostat/galvanostat 7b and the recorder 8 were connected to the device, but without voltage application or the like during the evaluation of durability. The 90% by mass aqueous sodium silicate solution was added as the hydrogen detection solution 6b into the acrylic vessel 3b. As Comparative Example, a device was also prepared, in which the 0.2 M aqueous sodium hydroxide solution was added as the hydrogen detection solution 6b in the acrylic vessel 3b. For evaluation of the durability of the hydrogen permeability testing device at low temperatures, the testing device was kept for about 24 hours, in a cooling container 9 maintained at –20° C. Table 2 summarizes occurrence or absence of crack of the acrylic vessel 3b in the hydrogen permeability testing device. Comparative Example with use of the 0.2 M aqueous sodium hydroxide solution was found to cause crack of the acrylic vessel 3b in the hydrogen permeability testing device, and leakage of the hydrogen detection solution 6b. In contrast, Example with use of the 90% by mass aqueous sodium silicate solution was found to cause no crack of the acrylic vessel 3b in the hydrogen permeability testing device. Therefore, it was found that the hydrogen permeability testing device according to the embodiments of the present invention excels in durability at low temperatures.

TABLE 2

| Hydrogen detection solution | Damage of vessel kept under cooling | Category |
|---|---|---|
| 90% aqueous sodium silicate solution | Not damaged | Example |
| 0.2M aqueous sodium hydroxide solution | Damaged | Comparative Example |

This application claims priority based on Japanese Patent Application No. 2019-165535 filed on Sep. 11, 2019. Japanese Patent Application No. 2019-165535 is incorporated herein by reference.

INDUSTRIAL APPLICABILITY

Embodiments of the present invention can provide a device capable of evaluating, even at low temperatures, the amount of hydrogen in metal materials, which is one of the dominant factors of sudden crack (delayed fracture) of the metal materials when the metal materials used in various industrial machines including automobiles and transport machines are exposed to a corrosive environment due to the atmosphere, wind, rain, sea salt, snow melting agents for roads or the like.

EXPLANATION OF REFERENCES

1: Hydrogen permeability testing device
2: Metal specimen
3a, 3b: Electrolytic vessel
4a, 4b: Counter electrode
5b: Reference electrode
6b: Hydrogen detection vessel
7a, 7b: Potentiostat/galvanostat
8: Recorder

The invention claimed is:
1. A hydrogen permeability testing device, comprising:
a metal specimen comprising a hydrogen entry face through which hydrogen enters, a hydrogen detection face on which the entered hydrogen is detected, and a metal plating formed on the hydrogen detection face to detect the entered hydrogen;

a reference electrode and a first counter electrode configured for making an electrochemical reaction progress;

a first electrolytic vessel provided on a side of the hydrogen detection face, housing the reference electrode and the first counter electrode, and comprising an aqueous sodium silicate solution having a freezing point of 0° C. or lower, wherein a concentration of the sodium silicate in the aqueous sodium silicate solution is 70% by mass or higher;

a second electrolytic vessel provided on a side of the hydrogen entry face housing a second counter electrode and no reference electrode; and a measurement unit configured to measure an amount of the hydrogen based on a current value resulting from the electrochemical reaction progress.

2. The hydrogen permeability testing device of claim 1, wherein a relationship between Baumé degree, Bh, of the aqueous sodium silicate solution and an operating temperature, T (° C.), satisfies:

$$T \geq -0.5 \times \exp (0.09 \times Bh).$$

3. The hydrogen permeability testing device of claim 2, wherein a molar ratio of $SiO_2/Na_2O$ in the aqueous sodium silicate solution is 3.5 or smaller.

4. The hydrogen permeability testing device of claim 3, wherein the metal plating comprises Ni, Pd, and/or Au.

5. The hydrogen permeability testing device of claim 1, wherein a molar ratio of $SiO_2/Na_2O$ in the aqueous sodium silicate solution is 3.5 or smaller.

6. The hydrogen permeability testing device of claim 5, wherein the metal plating comprises Ni, Pd, and/or Au.

7. The hydrogen permeability testing device of claim 1, wherein the metal plating comprises Ni, Pd, and/or Au.

8. The hydrogen permeability testing device of claim 1, wherein the metal plating is formed from Ni, Pd, or Au.

9. The hydrogen permeability testing device of claim 1, wherein the aqueous sodium silicate solution consists of $SiO_2$, $Na_2O$ and water.

10. The hydrogen permeability testing device of claim 1, wherein the aqueous sodium silicate solution prevents an anode side of the metal specimen from corroding.

11. The hydrogen permeability testing device of claim 1, wherein a freezing point of the aqueous sodium silicate solution is −15° C. or lower.

12. The hydrogen permeability testing device of claim 1, wherein the aqueous sodium silicate solution consists essentially of $SiO_2$, $Na_2O$ and water.

13. The hydrogen permeability testing device of claim 1, wherein the hydrogen detection face of the metal specimen is in direct contact with and immersed by the aqueous sodium silicate solution.

14. The hydrogen permeability testing device of claim 1, wherein the concentration of the sodium silicate in the aqueous sodium silicate solution is 90% by mass or higher.

15. A method for measuring an amount of hydrogen, the method comprising:

preparing the hydrogen permeability testing device of claim 1;

leaving the hydrogen permeability testing device to stand for 5 hours or longer after the preparing; and measuring, after the leaving, the amount of the hydrogen based on the current value resulting from the electrochemical reaction progress.

* * * * *